W. PRATT.
TIN CAN OR RECEPTACLE.
No. 11,264. Reissued Aug. 16, 1892.
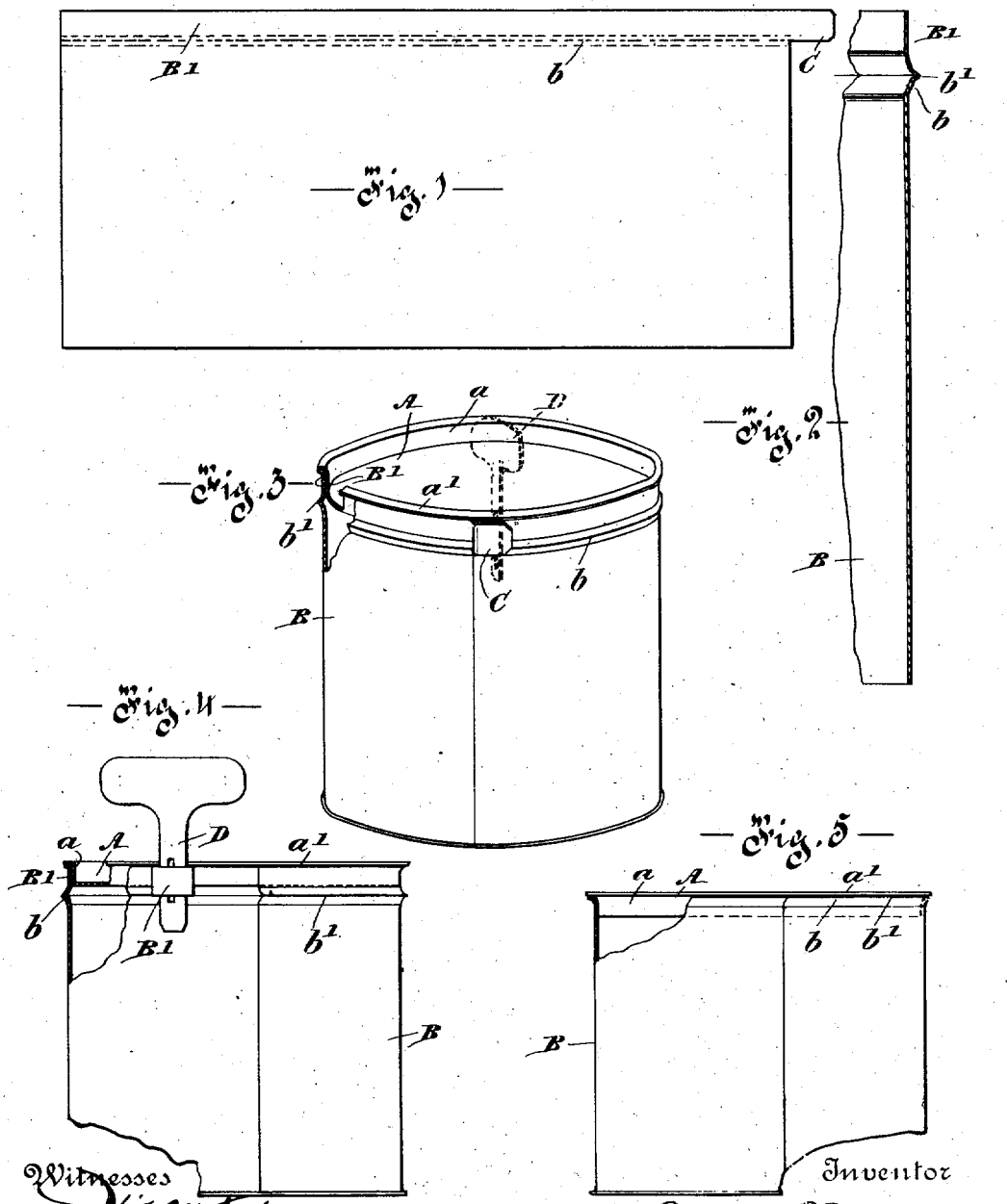
Witnesses
Fred J. Clare
Inventor
William Pratt
By his Attorney
Ras Hitchcock

UNITED STATES PATENT OFFICE.

WILLIAM PRATT, OF MONTREAL, CANADA.

TIN CAN OR RECEPTACLE.

SPECIFICATION forming part of Reissued Letters Patent No. 11,264, dated August 16, 1892.

Original No. 471,736, dated March 29, 1892. Application for reissue filed July 11, 1892. Serial No. 439,732.

*To all whom it may concern:*

Be it known that I, WILLIAM PRATT, of the city of Montreal, in the district of Montreal and Province of Quebec, Canada, have invented certain new and useful Improvements in Tin Cans or Receptacles; and I do hereby declare that the following is a full, clear, and exact description of the same.

This invention relates to cans or receptacles constructed of tin or like material and intended to be sealed after filling, opened, and kept in use for some time, the original cover being retained for further use. Heretofore the constructions for such purpose have been such as to render it somewhat difficult to set the cover in place both at the time when the cover is first secured to the body and after it has been removed, considerable difficulty being also experienced in removing the cover after its insertion subsequently to the first opening of the can.

My invention consists in making the cover with a peripheral rim shaped in part to fit within the body and to rest upon the edge of same, the part fitting inside being soldered to the body and forming a beading of special cross-section in such body just below the portion to which the cover is soldered, which portion, the same as in other well-known forms, has an extended free overlapping end, whereby upon taking hold of such free end and forcibly pulling upon same the portion of the body above the beading will be detached along the line of the beading from the main section of the body and from the cover-rim to which it was soldered, and the shape of the beading and the rim of the cover make it possible to reuse the cover without any degree of trouble. For full comprehension, however, of the invention, reference must be had to the annexed drawings, forming part of this specification, in which like symbols indicate corresponding parts, and wherein—

Figure 1 is a plan view of a blank, showing the line of the beading and the preferable manner of securing the extended free overlapping end for detaching purposes. Fig. 2 is an enlarged transverse vertical section of such blank. Fig. 3 is a perspective elevation, partly broken away, of the can as originally closed; Fig. 4, a similar view showing the connecting portion of the body partly detached, and Fig. 5 a similar view showing the can closed by the original cover after having been opened by removing the connecting-strip.

A is the cover of the can, having an upwardly-projecting peripheral rim, presenting a vertical portion *a* parallel to the sides of the can and a horizontal flange *a'* to rest on the top edge of the body.

B is the body, formed from a blank, such as shown in Fig. 1, having a beading *b* of the form or cross-section shown in Fig. 2 pressed in it parallel with its top edge and at such a distance below the same as to mark off the upper portion B' of the can (which portion is the connecting-strip) at a depth about corresponding to that of the vertical portion *a* of the cover-rim. This beading *b* is of an obtuse or wide V-shaped form or cross-section in the main, but has a more acute depression or extension *b'* at its apex, the formation of which extension slightly stretches or abrades the coating or exterior of the metal and allows of the easy and uniform detachment of the connecting-strip B along the line of such apex. It will also be noticed that the wide V-shaped form of the bead *b* serves to strenghen the cans both before and after the severance of the connecting-strip.

C is an extension at the end of the connecting-strip B', which when the ends of the body are brought together, overlapped (with the end having such extension outermost) and soldered, remains free to project, so that by drawing upon it in the usual way by the use of the flat slotted key D (indicated in Figs. 3 and 4) such connecting-strip is readily removed. When this is accomplished, a clean smooth upper edge, slightly flared, is left upon the body of the can, and the cover is equally free from any abrasions or unevenness that might interfere with its easy insertion into place and the attainment of a perfectly-tight fit between it and the body, and it will readily be seen that the horizontal flange *a'* makes it very easy to remove the cover after it has been inserted subsequently to the opening of the can. I might also point out that in manufacturing the cans the cover and body can be more readily fitted together, owing to the peripheral rim of the cover being devoid of plain edges for insertion, as in former constructions.

What I claim is as follows:

1. A tin can or receptacle the cover of which is formed with a peripheral rim shaped in part to fit within the body and to rest upon the edge of same, and the body having an integral detachable connecting-strip, to which the inserted portion of such cover is soldered, and means for detaching said strip, as set forth.

2. A tin can or receptacle the cover of which is formed with an upwardly-projecting peripheral rim shaped in part to fit within the body and to rest upon the edge of same, the body having an integral detachable connecting-strip, to which the inserted portion of such cover is soldered, and said strip having an extended free end to furnish a holdfast for its removal.

3. A tin can or receptacle the cover of which is formed with a peripheral rim shaped in part to fit within the body and to rest upon the edge of same, and after being soldered to the body is removable therefrom and capable of reuse by the removal from cover and body of a detachable connecting-strip provided by an outwardly-pressed V-shaped beading or depression in such body near its upper edge, adapted to be severed at its apex to allow the removal of said strip and present an outwardly-flaring edge for the easy reinsertion of said cover, as set forth.

4. A tin can or receptacle having upon its perimeter a beading, the cross-section of which is of an obtuse or wide V-shaped form in the main with an extended acute apex, for the purposes set forth.

WILLIAM PRATT.

Witnesses:
OWEN EVANS,
FRED. J. SEARS.